R. RICHMOND.
CARVING-FORK.
No. 175,504. Patented March 28, 1876.
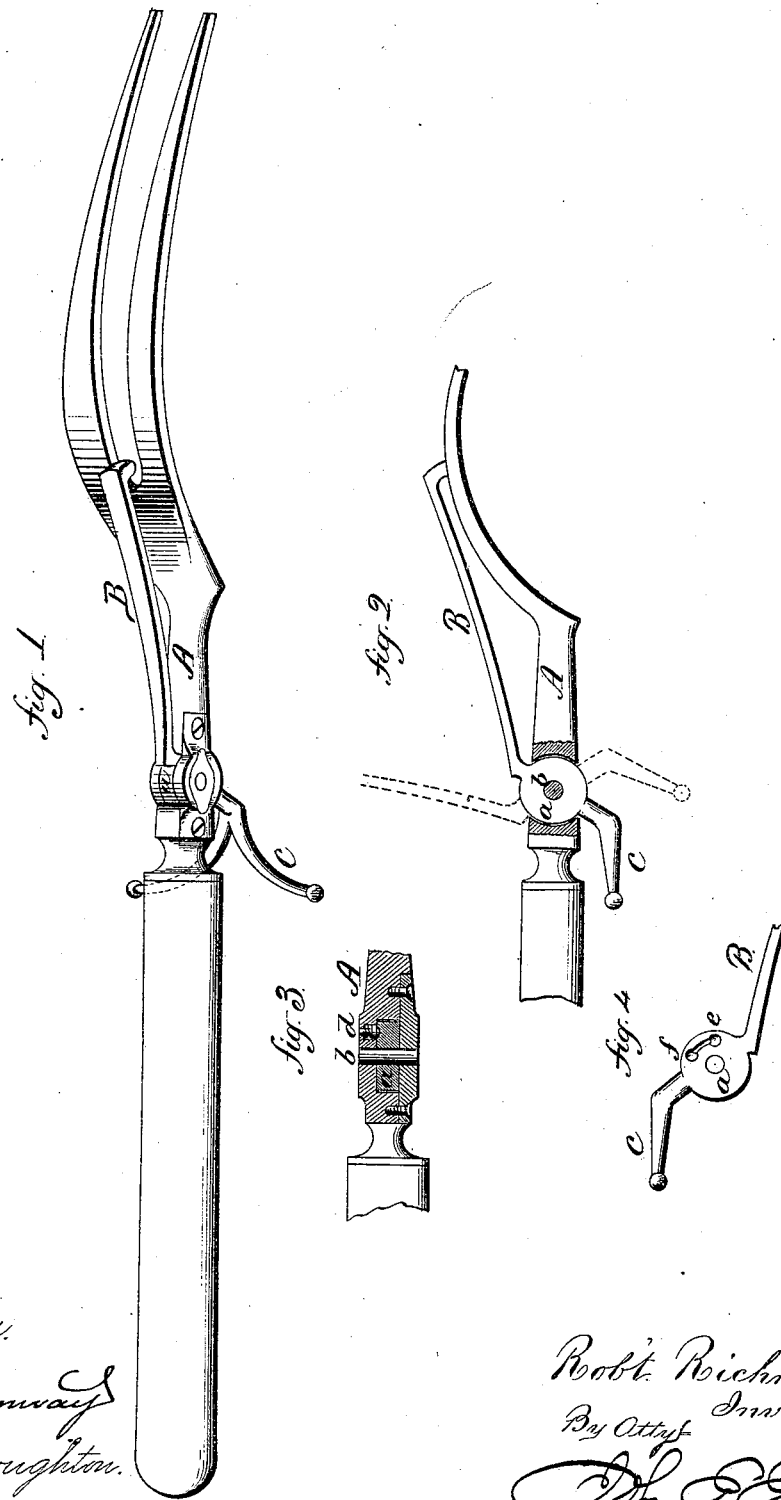

United States Patent Office.

ROBERT RICHMOND, OF NEW BRITAIN, CONNECTICUT, ASSIGNOR TO JAMES D. FRARY, OF SAME PLACE.

IMPROVEMENT IN CARVING-FORKS.

Specification forming part of Letters Patent No. 175,504, dated March 28, 1876; application filed January 24, 1876.

*To all whom it may concern:*

Be it known that I, ROBERT RICHMOND, of New Britain, in the county of Hartford and State of Connecticut, have invented a new Improvement in Carving-Forks; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, sectional side view; Fig. 3, horizontal section; Fig. 4, side view of the guard and rest detached.

This invention relates to an improvement in that class of carving-forks in which the guard is hung in the shank, and extends through to form a rest beneath.

In the usual method of constructing these forks there has been an open space through the shank, and in case of a spring, that has been exposed.

The object of this invention is to make a close joint, and provide it with a spring unexposed; and it consists in constructing the guard and rest with a horizontal cylindrical body, to fit a corresponding recess in the shank, and combined with a spring-catch, whereby the guard is temporarily secured in either the closed or open position.

A is the shank of the fork; B, the guard, and C the rest, the guard above the fork and the rest below, as shown. At the point which is to form the pivot or bearing, the guard and rest are constructed with a cylindrical body, $a$, and the shank of the fork is recessed correspondingly, to receive the said cylindrical body, and through the shank and this cylindrical body the pivot $b$ is passed, so that in turning up to the position of guard and rest there will be no recess or space exposed around the body $a$ in the shank of the fork. In one side of the recess in which the cylindrical body is placed, a horizontal spring-stud, $d$, is arranged, its inner end protruding into the recess where the guard is hung, but the spring allowing it to be forced back flush with the surface of the recess. The body $a$ of the guard is formed with two indentations, $e f$, one of which corresponds to the stud $d$ when the guard is in the closed position, and the other to the position of the guard in its open position; hence, when set in either of these positions, the stud $d$ will be forced into the corresponding indentations $e$ or $f$, and there temporarily hold the guard in such position, but so that when power is applied to close or open the guard, as the case may be, the spring-stud will yield and allow the guard to be thus moved.

This construction of body and spring is applicable to the guard without the rest, or the rest without the guard. I therefore do not confine myself to the combination of the guard and rest in one and the same piece; but

I claim—

1. In combination with a carving-fork, the guard B, constructed with a cylindrical body, $a$, and the shank of the fork with a corresponding cylindrical recess, within which the said body is hung, and an automatic spring, arranged to support or hold the said guard, substantially as described.

2. In combination with a carving-fork, the rest C, constructed with a cylindrical body, $a$, and the shank of the fork with a corresponding cylindrical recess, within which the said body is hung, and an automatic spring arranged to support or hold the said rest, substantially as described.

3. In combination with a carving-fork, the guard B and rest C, in one and the same piece, with a cylindrical body, $a$, and the shank of the fork with a corresponding cylindrical recess, within which the said body is hung, and an automatic spring arranged to support or hold the said guard and rest, substantially as described.

ROBERT RICHMOND.

Witnesses:
H. H. BARLOW, Jr.,
WILLIE SCANLON.